United States Patent [19]

Larson et al.

[11] Patent Number: 4,823,820
[45] Date of Patent: Apr. 25, 1989

[54] SOLVENT VAPOR COLLECTION AND EVACUATION SYSTEM

[75] Inventors: Douglas A. Larson, Oak Park; John C. Justice, Elburn, both of Ill.

[73] Assignee: Safety-Kleen Corp., Elgin, Ill.

[21] Appl. No.: 78,772

[22] Filed: Jul. 28, 1987

[51] Int. Cl.[4] .............................................. B08B 3/08
[52] U.S. Cl. ..................... 134/109; 134/108; 134/166 C; 134/169 C; 239/106; 239/112; 118/302
[58] Field of Search ................. 134/99, 11, 12, 102, 134/104, 109, 105, 108, 166 C, 169 C, 200, 201; 239/106, 112; 55/320, 441, 468; 118/302

[56] References Cited

U.S. PATENT DOCUMENTS

| | | | |
|---|---|---|---|
| 2,245,892 | 6/1941 | Anschicks et al. | 134/201 |
| 2,569,125 | 9/1951 | Costantino | 134/201 X |
| 2,578,572 | 12/1951 | Melvin et al. | 134/201 |
| 2,786,000 | 3/1957 | Roach | 134/200 |
| 3,771,539 | 11/1973 | DeSantis | 134/111 |
| 3,789,861 | 2/1974 | Conn et al. | 134/166 C |
| 3,904,431 | 9/1975 | Dinerman | 134/201 X |
| 4,025,363 | 5/1977 | DeSantis | 134/200 X |
| 4,785,836 | 11/1988 | Yamamoto | 134/56 R |

Primary Examiner—Harvey C. Hornsby
Assistant Examiner—Frankie L. Stinson
Attorney, Agent, or Firm—Lockwood Alex Fitzgibbon & Cummings

[57] ABSTRACT

A spray gun cleaning apparatus having a cleaning basin with an open top portion, a cleaning solvent reservoir, means for circulating solvent from the reservoir to the interior of the basin, and a vapor collection system associated with the basin. The vapor collection system includes a vapor collection manifold positionable adjacent to the periphery of the basin, manifold inlet means extending about the periphery of the basin, an exhaust opening in a portion of said manifold, a vacuum source having its inlet end in communication with the manifold exhaust opening and its outlet end in communication with a vapor discharge line. Upon actuation, the vacuum source evacuates vapors from the manifold interior by inducing air and vapor flow from the interior of the basin through the manifold and into the vapor discharge line.

17 Claims, 6 Drawing Sheets

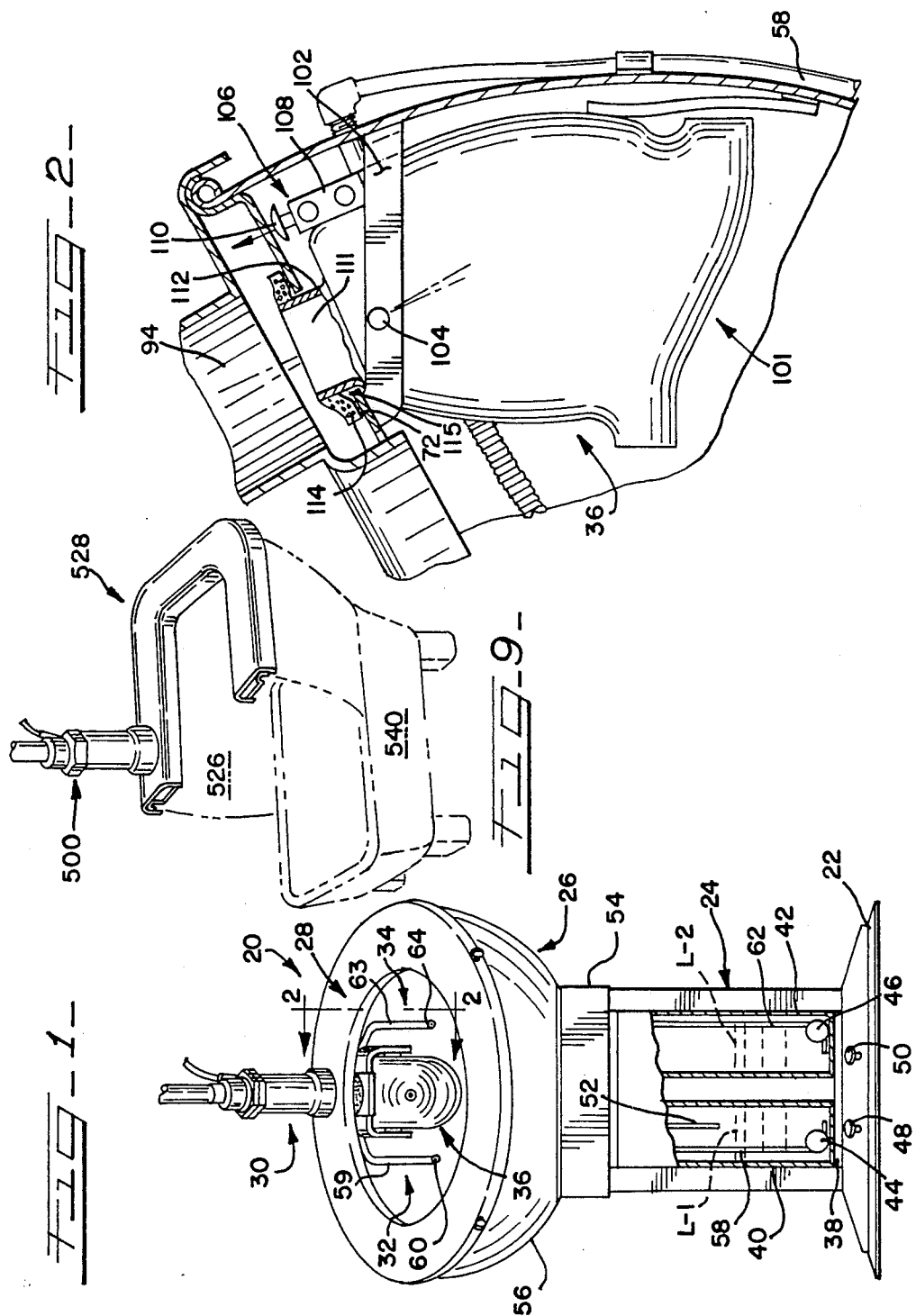

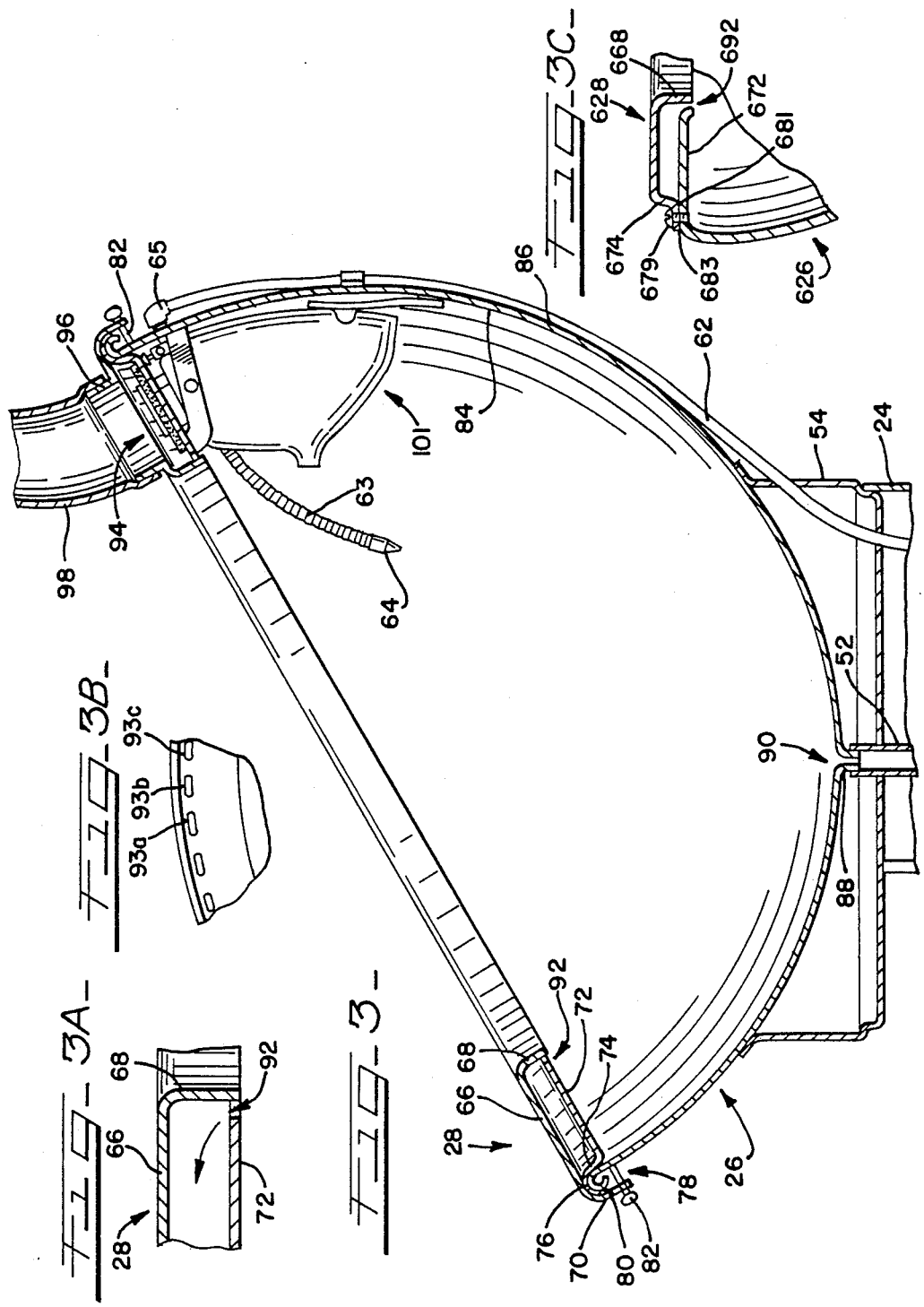

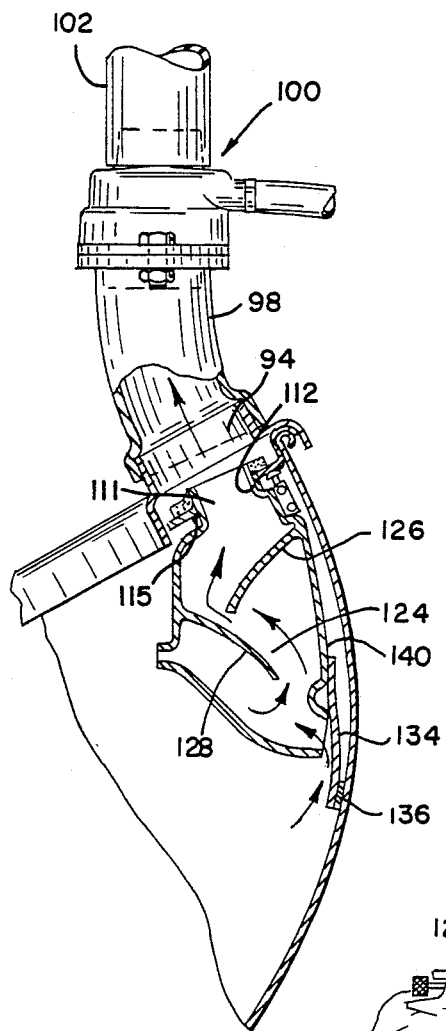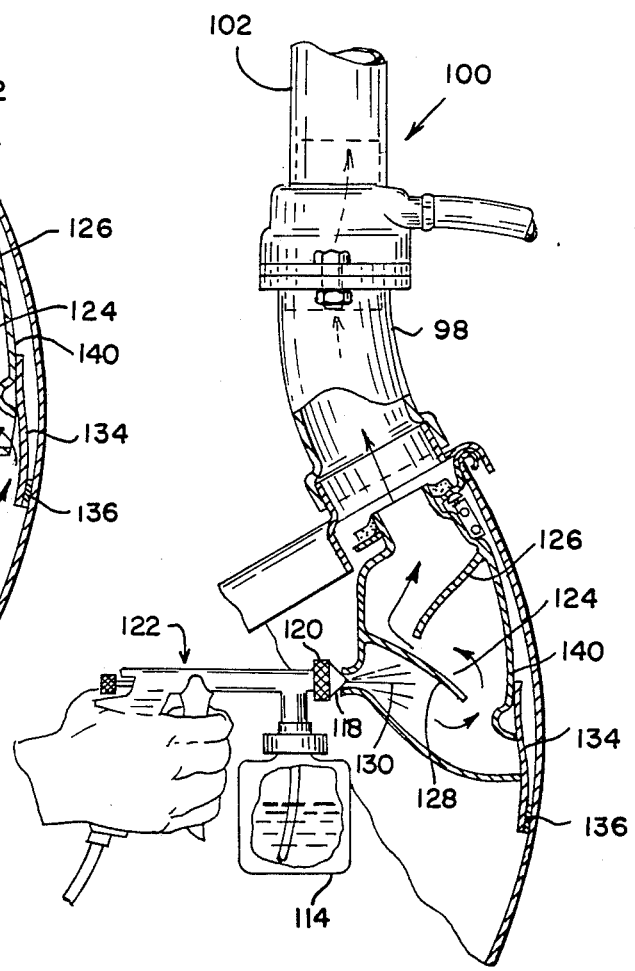

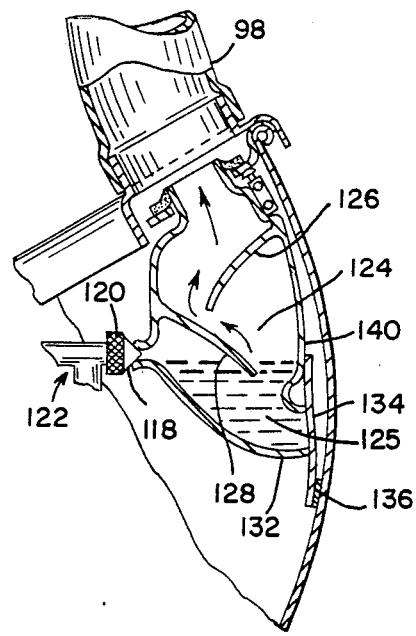
Fig-6-
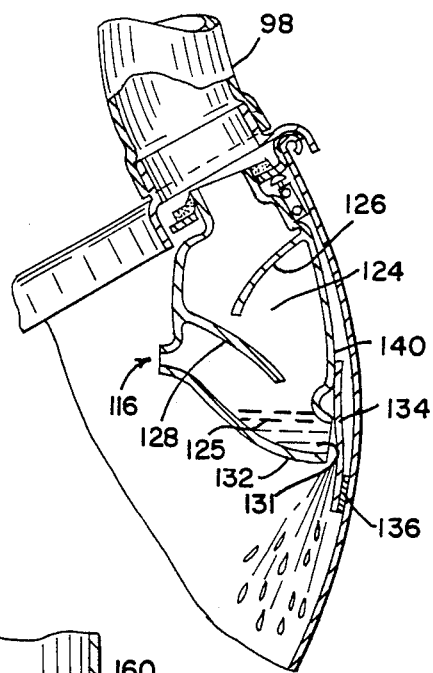
Fig-7-
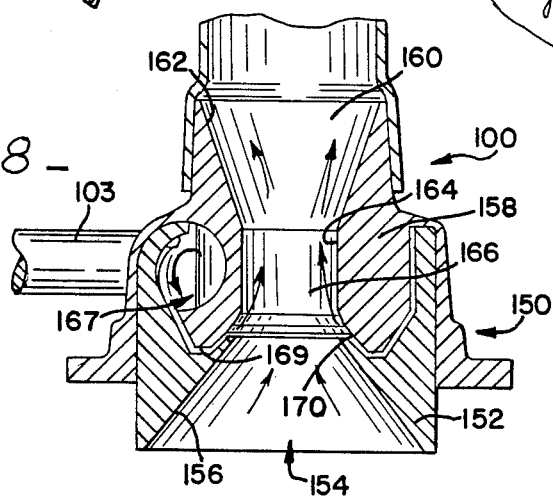
Fig-8-

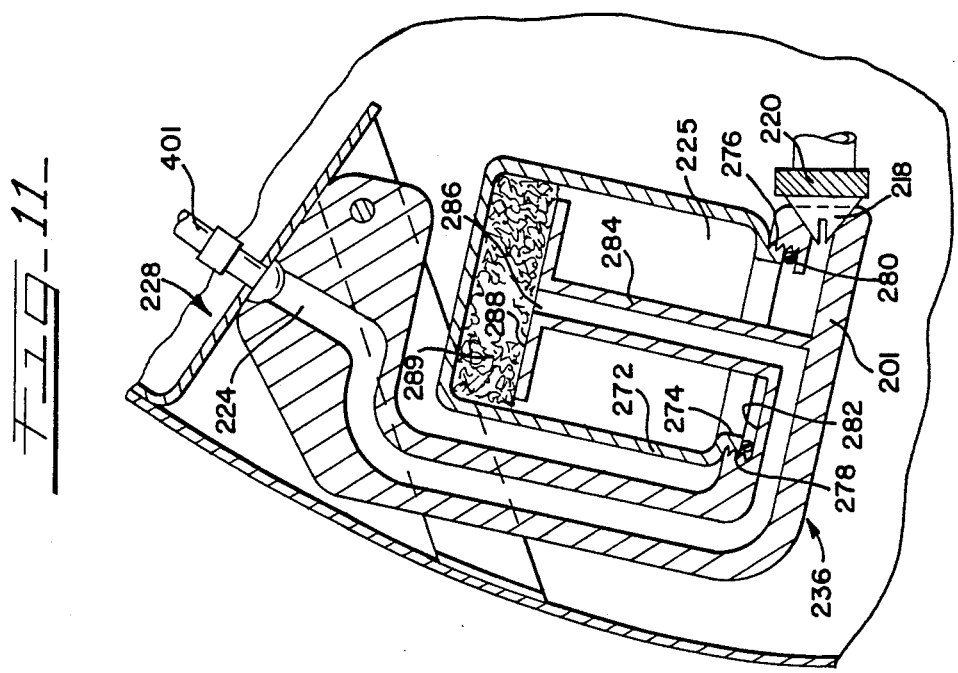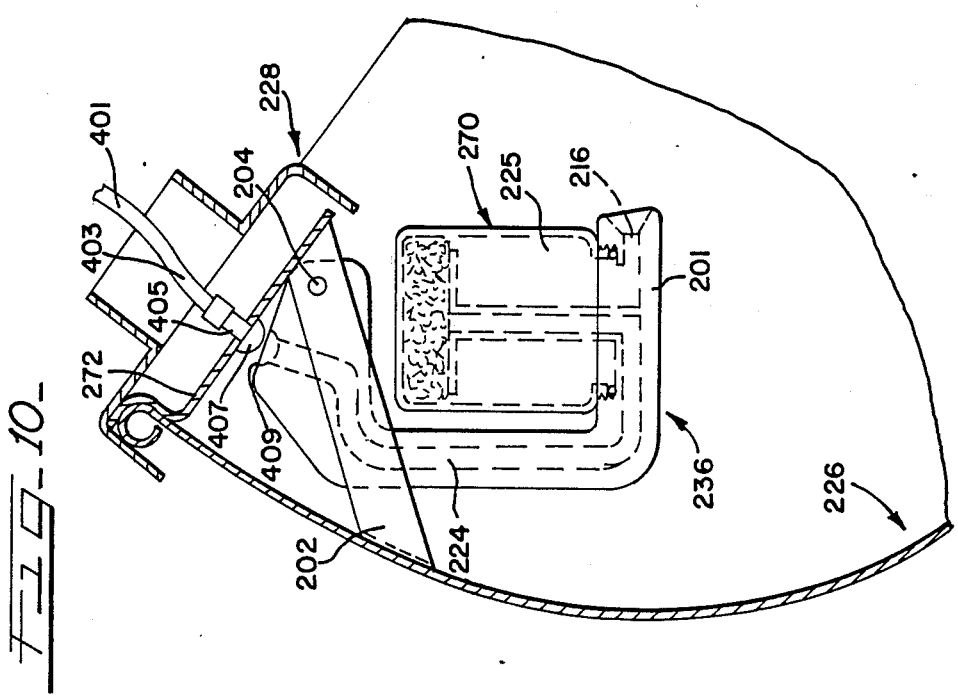

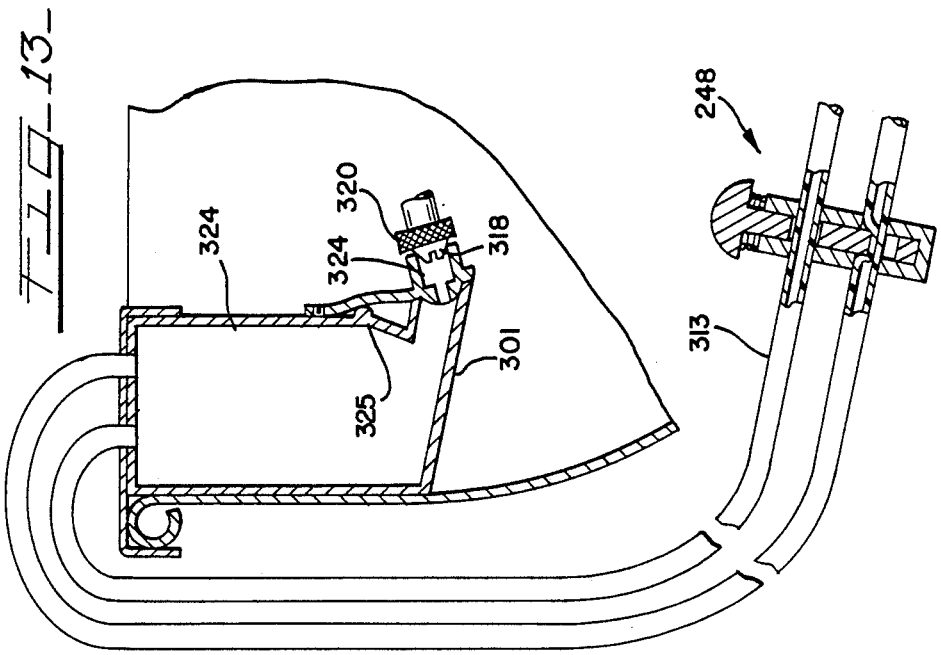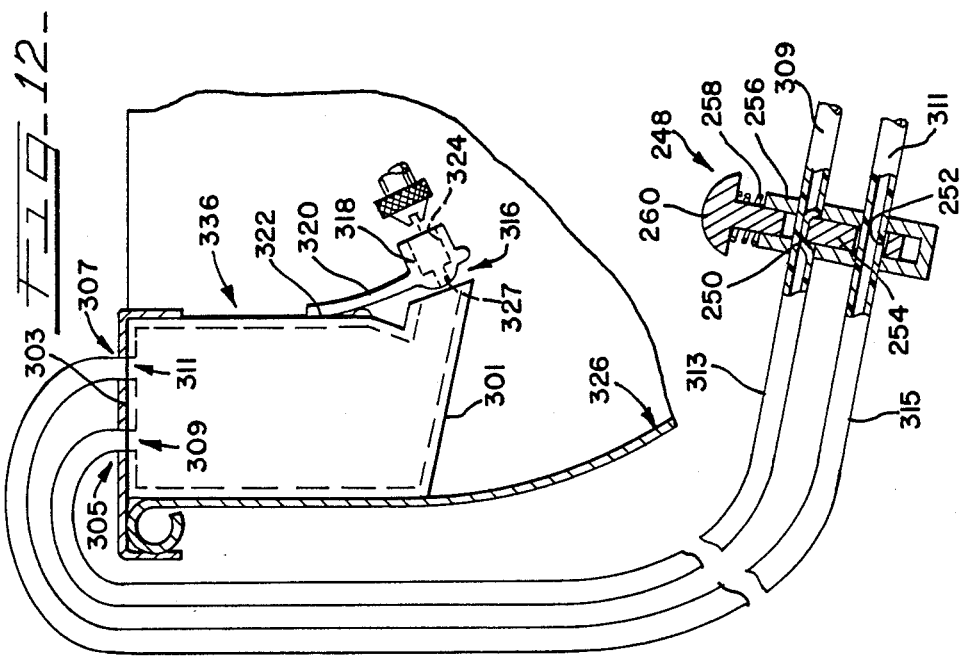

SOLVENT VAPOR COLLECTION AND EVACUATION SYSTEM

BACKGROUND OF THE INVENTION

The present invention relates generally to industrial cleaning apparatus, and more particularly, to apparatus intended, in one aspect, to provide an improved cleaning action for paint or like spray guns, and in another aspect, to a solvent vapor evacuation system adapted generally for use with cleaning apparatus using solvent as the cleaning medium.

It is known that spray guns, such as those used to apply paint or like hardenable coatings, must be cleaned after use to prevent damage and to facilitate ready reuse thereof.

Also, it is known in the art to clean a spray gun by filling the paint cup or reservoir with solvent, and drawing it through the interior workings of the gun, including the discharge nozzle, mixing chamber, if any, and various valves controlling the flow of air and liquid therethrough until the unit has been cleaned sufficiently for satisfactory storage and/or subsequent use.

According to accepted practices, paint thinner or similar solvent is required for the purpose of preventing the coating from hardening. However, while suitable solvents are highly effective for this purpose, given sufficient time and agitation potential, and further provided that they are applied promptly, not only common sense, but also various health and safety regulations now require considerably restricted and carefully controlled use of many if not all volatile solvents in an industrial environment. Unlicensed disposal of such solvents is either forbidden altogether or severely restricted.

Accordingly, there is a need for a spray gun cleaner or the like, which includes or is adapted to include means for reducing the evaporation potential of cleaning solvents to an acceptable minimum during such operations. There is also a need for apparatus wherein solvents used for cleanup may be conveniently confined for periodic disposal and/or exchange rather than being simply discarded after use.

According to one aspect of the present invention, an apparatus is provided which includes a cleaning basin with an open top or the like into which a spray gun may be inserted for manipulation during the cleaning operation. The apparatus further includes means for a manifold, preferably in the form of a collar surrounding the basin, which acts, in cooperation with a vacuum source, to draw potentially harmful vapors away from the work area and direct them into a predetermined exhaust collector or discharge area which is remote from the work place and which thus complies with environmental regulations.

In one form of the invention, an apparatus is provided which includes means for receiving and positioning one or more solvent containers beneath an open top cleaning basin which in turn is served by solvent conduits terminating in nozzles adapted to direct solvent to the spray gun or similar apparatus to be cleaned. The basin collects the liquid cleaning solvent and returns it to one or both storage receptacles, while the manifold collects solvent vapor and exhausts it from the work area.

Still further, a liquid/vapor separator is provided which permits controlled accumulation, discharge and return of liquid phase solvent for maximum effective use without compromising the collection of solvent vapor.

Thus, the apparatus includes several mechanisms adapted to provide the maximum effectiveness in use and the greatest economy consistent with safety and environmental compliance In view of the need for an improved solvent cleaning apparatus which is economical, safe and simple, it is an object of the present invention to provide an improved spray gun cleaner which provides simple and effective means for counteracting the adverse effects of potential harmful solvent evaporation into the workplace.

Another object of the invention is to provide a spray gun cleaner or parts washer having an evaporation control system which includes a cleaning basin surrounded by a vapor collection manifold, a phase separator unit controllable by an operator, and including a vapor outlet opening communicating in use with the vapor collection manifold.

Yet another object of the invention is to provide an operator controlled exhaust system for collecting solvent or like vapors from a parts or spray gun cleaner and removing the vapors from the workplace to a remote location for discharge or collection.

A further object of the invention is to provide an improved spray gun or like cleaner which includes a manually operable solvent collector and vapor/liquid phase separator actuable by the operator to assist in cleaning of such spray guns or the like A still further object of the invention is to provide the foregoing features in a simplified and safe cleaning apparatus which includes means for collecting and returning spent solvent to a storage receptacle for recirculation and reuse under the control of an operator.

Another object of the invention is to provide a vapor collection system which is adaptable to a variety of cleaning machines which utilize solvent for industrial cleaning or like purposes.

Another object of the invention is to provide a vapor collection apparatus for use with a spray gun and the like which includes various embodiments of a spray collector and solvent phase separator unit for use with a paint spray gun or like apparatus.

A further object of the invention is to provide a cleaning apparatus which includes a spray collector and solvent phase separator unit to provide a versatile spray gun cleaning action and to facilitate control and/or evacuation of solvent vapors.

A still further object of the invention is to provide a spray collector and solvent phase separator unit wherein operative connections between the separator, the gun nozzle and the vapor collection system are made in use by tilting or tipping the assembly as a whole relative to the solvent receptacle.

Yet another object of the invention is to provide a spray gun cleaner providing a valve body with a solvent reservoir, a solvent drain and a solvent vapor evacuation system controllable at least in part by the operator.

A still further object is to provide a spray collector and solvent phase separator which includes a solvent receiver positioned for removable attachment to the separator body which preferably includes a filter and sight glass arrangement t facilitate filter maintenance and solvent evacuation.

These and other objects and advantages of the invention are achieved in practice by providing, on the one hand, a solvent vapor collection system comprising a manifold encircling an opening formed in the top of a cleaning basin, with the manifold including at least one peripheral inlet passage, a tubular vapor flow passage of enlarged cross-section surrounding the periphery of the receptacle, a manifold exhaust outlet, and means connecting the manifold outlet with a vacuum source disposed in a solvent vapor collection and discharge line.

The invention achieves certain of its other objects and advantages by providing a cleaning basin and manifold which further includes means for inducing solvent flow through an associated spray gun nozzle, means for separating liquid solvent from solvent vapors and for discharging liquid solvent periodically back into a solvent storage reservoir, while exhausting the solvent vapors to a safe location. Preferably, the liquid solvent is recirculated from the storage reservoir through the spray gun and back to the storage reservoir for reasons of economy.

The manner in which the foregoing and other objects and advantages of the invention are achieved in practice will become more clearly apparent when reference is made to the following detailed description of the preferred embodiments of the invention set forth by way of example, and shown in the accompanying drawings, in which like reference numbers indicate corresponding parts throughout.

BRIEF DESCRIPTION OF THE DRAWINGS

FIG. 1 is a front elevational view, with portions broken away, of a cleaning apparatus embodying the present invention;

FIG. 2 is an enlarged vertical sectional view, taken along lines 2—2 of FIG. 1, and showing the combination spray collector and solvent phase separator unit of the apparatus of FIG. 1;

FIG. 3 is an enlarged vertical sectional view of the apparatus of FIG. 2, showing the cleaning basin, the vapor collection manifold and other elements of the apparatus of the invention;

FIG. 3A is a further enlarged view of a section of the vapor collection manifold of FIG. 3;

FIG. 3B is a fragmentary bottom plan view of portions of a form of vapor collection manifold having plural fluid inlet openings;

FIG. 3C is a fragmentary sectional view of a portion of an alternate form of top and basin manifold construction;

FIG. 4 is a fragmentary sectional view, with portions broken away, of the form of phase separating unit of FIG. 2, and showing it in one stage of its operation;

FIG. 5 is a view similar to that of FIG. 4, and showing the phase separator unit in position of use with solvent flowing through the gun during cleaning;

FIG. 6 is a view similar to that of FIGS. 4 and 5, and showing the separator unit in a subsequent stage, with the liquid receiver of the separator being shown filled with solvent;

FIG. 7 is a view of the separator unit of FIGS. 4–6 and showing liquid draining therefrom after use;

FIG. 8 is a vertical sectional view, on an enlarged scale, of the venturi type vacuum source apparatus which provides a solvent vapor evacuation action;

FIG. 9 is a fragmentary perspective view of the vapor collection and evacuation apparatus of the invention used with another form of solvent type washer unit;

FIG. 10 is a view, partly in elevation and partly in section, of a modified form of solvent phase separator and vapor evacuation assembly forming a part of the invention, and showing the same in the inactive or "off" position;

FIG. 11 is an enlarged vertical sectional view of the assembly of FIG. 10, showing the same in the active or "on" position;

FIG. 12 is a view, partly in elevation and partly in section, of a still further modified form of solvent phase separator and control unit therefor made according to the invention, and showing the same in the open or draining position; and FIG. 13 is a vertical sectional view of the apparatus of FIG. 12, showing the same in the closed or actuated position.

DESCRIPTION OF THE PREFERRED EMBODIMENTS OF THE INVENTION

While it is understood that the invention may be embodied in different forms of apparatus and, particularly as regards the vapor collection system, the apparatus may assume whatever different peripheral and cross-sectional shape is indicated by the associated cleaning basin or receptacle, a preferred form of the invention will be described with respect to an embodiment wherein the reservoirs for solvent are disposed beneath an open top generally hemispherical basin which is tilted forwardly, and having its outer rim formed by a rolled bead of generally circular cross section. The manifold or collar is preferably of a flattened annular form, having a substantially continuous peripheral inlet for solvent vapors. Compressed air directed through a venturi device acts as a vacuum source for evacuating solvent vapors from the collection manifold.

In the preferred form of spray collector and solvent phase separation valve, the entire assembly is pivotally mounted with respect to the manifold and includes a solvent inlet opening, a liquid drain or outlet opening, and a vapor vent communicating with the exhaust manifold; appropriate valves are provided where necessary.

Referring now to the drawings in greater detail, FIG. 1 shows the apparatus of the invention to be embodied in a spray gun cleaner generally designated 20 and shown to include a number of principal components, including a pedestal 22, a cabinet generally designated 24, a cleaning basin or receptacle generally designated 26, a vapor collection manifold in the form of a collar generally designated 28, and a venturi type or equivalent vacuum source 30 used for vapor evacuation.

In addition, the apparatus preferably includes a pair of solvent supply conduits generally designated 32 and 34, and a combination spray collector and solvent phase separator unit generally designated 36.

Referring again to FIG. 1, it is there shown that the cabinet 24 includes a shelf 38 or the like on its interior for housing left and right hand side solvent reservoirs 40, 42, each of which is filled with cleaning solvent to levels shown respectively as L-1 and L-2. The left hand solvent reservoir 40 is shown to include a submersible pump and motor assembly 44 therein, while a similar pump and motor assembly 46 is disposed within the right hand container 42. Actuation of these motors to circulate solvent to the interior of the cleaning basin 26 is accomplished under the control of foot pedals 48, 50 which operate switches (not shown) disposed in the pedestal 22.

As will appear, at least one of the reservoirs 40 includes a solvent return line 52 through which solvent flows when it is returned from the basin 26 to the reservoir 40 for recirculation. The form of pump and motor used to achieve a recirculating action is not an aspect of the invention which is novel per se, and such pump and motor may be of any type known to those skilled in the art, whether operated by air or electricity Such pumps and motors, for example, may be the type of submersible pump and motor referred to in U.S. Pat. No. 3,522,814, or may include an air turbine disposed above the liquid level with liquid impeller and housing assembly disposed beneath the surface of the liquid.

Referring again to FIG. 1, there is shown also means in the form of an adapter 54 secured by welding or otherwise to an exterior surface 56 of the cleaning basin 26 to position the basin with respect to the cabinet 24 which houses the solvent reservoirs 40, 42.

In use of the apparatus, when the foot pedal switch 48 is depressed, the pump 44 is actuated and solvent passes through a pump outlet tube 58, through a discharge tube 59 and out the nozzle 60, from which it may be directed to the interior of the spray gun canister or otherwise Clean solvent contained in reservoir 42 may alternatively be caused to flow through a pump outlet tube 62 and out the nozzle 64 at the end of a discharge tube 63 by actuating the foot pedal switch 50. It will be understood that the tubes 58, 62 are maintained in fluid tight communicating relation to the outlets of the pumps and motors 44, 46 respectively, and that all the elements 58, 59 and 60 and 62, 63 and 64 comprise the respective solvent supply conduit systems 32, 34.

Referring now to a principal feature of the invention, namely, the provision of the solvent vapor collection system, FIGS. 2 and 3 show that a preferred form of this apparatus includes a vapor collection manifold generally designated 28, the vacuum source 30, and the phase separator 36. As used herein, the expression "manifold" is used in the broad sense of an apparatus for collecting vapors, gases or fluids in a distributed or larger area and discharging them in another, localized area It does not necessarily imply that there are several inlets and a single outlet.

As shown in FIG. 3, the manifold 28 preferably is of two-piece construction, wherein one of the pieces is a metal or plastic stamping including a generally annular top wall 66, a downturned inner sidewall 68, and a downwardly extending outer locating flange 70. The other component is also of annular form and includes an annular bottom wall 72, an upturned, contoured annular inner side wall 74, and a outer peripheral curl 76. The locating flange 70 and the outer curl 76 cooperate to form a locating groove generally designated 78 for receiving a rolled annular bead 8 forming the periphery of the cleaning basin 26. Thumb screws 82 or the like are provided to removably secure the manifold to the basin bead 80.

The basin itself includes an inner sidewall surface 84, an outer sidewall surface 86, and a lowermost, annular vertical flange 88 which defines a drain opening 90. A drain hose 52, which returns fluid to the used solvent reservoir 40, is attached to the drain flange 88. The adapter 54 serves to locate the basin 26 with respect to the upper portions of the receptacle housing 24; either a fixed or removable basin and adapter may be used.

FIGS. 1 and 3 show that the tube 62 extends upwardly from one reservoir 42 and along to the exterior surface of the basin 26. It is attached to the discharge tube 63, which lies inside the basin 26, at a locating fitting 65.

Referring now to FIG. 3A, it is shown that the manifold 28 includes a narrow peripheral gap or inlet opening 92 lying between the radially innermost edge of the manifold bottom wall 72 and the lowermost edge of the manifold inner side wall 68. In a preferred form, this provides a substantially continuous peripheral inlet for the manifold, which has a substantially rectangular cross-section and a plan view configuration which renders it compatible with the associated basin, i.e., it is sized and shaped so as to lie about the basin periphery in cooperating relation.

In lieu of the substantially continuous single manifold inlet opening 92 of FIGS. 3 and 3A, a series of individual ports or passages might be provided; it is also anticipated that one or more openings might in turn be partially closed or screened by a grillwork, by expanded metal, or other structure capable of providing a combination of structural support and the necessary inlet opening or openings. Those skilled in the art are aware that the exact size, shape and total surface area of the manifold inlet openings depends on the nature and capacity of the vacuum source, and that the ability to evaluate vapor effectively from a given region involves dependent relations of vacuum levels, volume or mass flow, and flow velocity.

Referring now to the uppermost portion of the manifold, that is, the portion which lies at the rear of the apparatus in its normal position of use, FIG. 3 shows that there is a manifold outlet or exhaust passage generally designated 94 in the form of a cylindrical wall or collar 96 over which is received a tubular intermediate connector 98. The upper end of the connector 98, as shown in FIGS. 4 and 5, for example, is affixed to the lowermost portion of a vacuum generator generally designated 100. The constructional details of this unit are referred to in detail herein, and are illustrated in FIG. 8.

Such details not being necessary to an understanding of the operation of the vapor collection manifold system just described, or to the operation of the solvent phase separator assembly, the construction and operation of the separator will now be described.

Referring now to this feature of the invention, namely, the solvent phase separator assembly of the invention, FIGS. 2-7 show the construction and operation of one form of this unit. Before referring in detail to its construction, however, a brief statement of its general purpose is believed helpful to an understanding of the invention. The valve assembly 36 is adapted to possess several functions, namely, to collect the discharge from a spray gun being cleaned, in both liquid and vapor phases, to retain the liquid collected for eventual discharge back into the cleaning basin, and at all other times, to provide a path of communication for the solvent vapors from the interior of the separator unit to the manifold and/or the vapor collection and exhaust system The separator may also include a solvent receiver, a filter assembly, sight glass, or other optional features.

Referring now to FIG. 2, the separator assembly 36 is shown to include a housing generally designated 101, a pair of mounting brackets (only one shown at 102), a housing pivot pin 104, an operating switch assembly generally designated 106 and shown to include a switch body 108 and a movable switch element 110. The separator 36 includes a vapor outlet passage 111 defined by a cylindrical neck 112 and a sponge rubber or like gasket 114.

Referring now to FIGS. 4-7, it will be noted that the separator assembly 36 also includes a spray nozzle inlet passage 116 adapted to be engaged by the nose portion 118 of a spray gun nozzle 120 affixed to a spray gun generally designated 122 (FIG. 5). The interior of the housing 101 includes an upper vapor passage 124 through which vapors may pass as shown by the arrows in FIGS. 4, 5 and 6 and a lower liquid receiver area 125. In this form of separator, baffles 126, 128 are provided to form a labyrinth which acts to deflect the spray droplets 130 entering the interior of the housing 100 towards the lower portion thereof. A liquid separator outlet passage 131 is formed in the bottom wall 132 of the housing. A flexible flap 134 has its lower ends equipped with a magnetic strip 136, and its upper end is affixed to the rear wall 140 of the housing 101. This flap 134 opens and closes the passage 131 and provides a valve action for control of fluids within the separator 36.

Referring now to FIGS. 2 and 4–7, the operation of the separator 36 will now be described. Assuming the operator wishes to clean a spray gun 122, the foot switch 48 is actuated, and solvent is pumped from a reservoir 40 through the nozzle 64 into the paint cup 144. The cup 144 is affixed to the gun 122, and its nose 118 is pressed against the separator inlet 116 in vapor-tight relation. This pivots the housing 101 toward the rear of the basin 26, holding the valve flap 134 closed, and actuating the vacuum "on" switch element 110. The gun trigger is pressed and solvent spray flows from the cup 144 through the gun 122 to clean its internal passages, and then to the interior areas 124, 125 of the separator housing 101. The spray being a combination of vapor and liquid phases, the volatile or vapor component is drawn upwardly and through the passage 111 in the neck 112 into the manifold 28, and through its exhaust opening 94, ultimately passing through the vacuum source 100. During this time, (FIG. 6) liquid phase solvent accumulates in the lower or receiver area 125 of the housing 101.

When the trigger is released and the gun nozzle is removed, (FIG. 7) the housing 101 swings away from the rear wall of the basin 26, allowing the flap 134 to open the liquid drain passage 131. The liquid thus discharged is collected by the basin and returned through the drain opening 90 and the tube 52 to the reservoir 40. The vacuum exhausting the solvent vapors may be disabled after a suitable delay by controls (not shown) associated with the switch 108. The switch 108 may not be necessary if other means are provided to insure vacuum when the spray is discharged.

FIG. 4 shows that as long as the vacuum source 100 remains active, vapors remaining in the interior 124 of the housing 101 continue to be evacuated to the discharge area 102 through passages 94, 111 and 98.

Referring now to FIG. 8, a preferred form of vacuum source 100 is illustrated. This unit includes a main body assembly generally designated 150 and shown in turn, to include a lower cone unit 152, having a vapor inlet 154 forming the lower portion thereof and having its inner surface formed generally with a sloping, continuous side wall 156. An upper cone unit 158 includes a vapor outlet 160 at its upper end and includes a tapering sidewall 162 and an intermediate throat section 164 creating a venturi area 166 of reduced cross section. An air supply plenum 167 is of generally annular form and is formed between spaced apart surfaces of the upper and lower cones 158, 152. An annular continuous passage 169 extends from the plenum 167 into a discharge annulus 170 lying just downstream of the throat or venturi 164. The discharge annulus 170 is formed so as to direct air upwardly, through the venturi 166 and towards the vapor outlet 160. When air under pressure is supplied, as through the hose 103 entering the vacuum supply 100 (FIG. 4), passage thereof along the inner cylindrical and conical sidewalls 164, 162 causes air and entrained vapor lying downstream of the source 100 to pass upwardly through the vacuum source 100 and ultimately to a discharge or collection area. As long as air is supplied to the plenum, a vacuum will be present in the interior of the manifold and in the interior of the solvent phase separator 36.

Referring now to FIGS. 10 and 11, an alternative form of phase separator is shown Here, a separator generally designated 236 includes a housing 201, positioned by mounting brackets 202 which secure a pivot pin 204 for the housing 201. The bracket 202 is fixedly mounted with respect to a bottom wall portion 272 of a manifold generally designated 228. The separator housing 201 includes an inlet opening 216, an interior passage 224 for solvent vapor and liquid receiver means 225 in the form of a removable jar or cannister 270.

In this embodiment, a small diameter vacuum line 401 is provided for direct removal of the vapors from the passage 224, and for this purpose, the end portion 403 of the vacuum line 401 terminates in a fitting 405 passing through the bottom wall 272 of the manifold 228. A contoured nose portion 407 of the fitting 405 is formed congruently with a pocket 409 formed in the upper portion of the housing 201. This insures a vapor tight connection when the housing 201 is pivoted to a position of engagement with the vacuum line 401.

Another feature of the embodiment of FIGS. 10 and 11 is that the removable jar or cannister 270 may have transparent sidewalls 272, with a reduced diameter neck portion 274 and threads 276 formed on the exterior thereof. The neck 274 is removably received within a threaded bore 278 in the housing 201. An O-ring 280 or the like provides a seal between the neck 274 and the bottom surface portions 282 of the pocket 278. A standpipe 284 having a central passage 286 and a radial flange 288 helps locate a removable mesh filter 290 and also helps provide the phase separating action.

In operation, when the nose portion 218 of a spray gun nozzle 220 is urged into vapor tight relation with the tapered inlet 216 and a force is exerted forwardly of the gun nozzle 220, the housing 201 pivots to the position of 211. The trigger of the gun is then actuated and assuming the gun cup is filled, the spray will be discharged into the interior of the glass cannister 270. Vapors then pas first upwardly and then radially inwardly of the cannister on the upper end of the flange 288, being drawn through the central passage 286 which communicates with the vapor outlet passage 224. In this instance, a foot switch may be depressed to draw a vacuum in the line 401, and this exhausts the vapors directly from the phase separator 236 without causing the vapors to pass into the interior of the manifold 228.

After the liquid reaches a level determined by the amount thereof present in the gun cup, or at any rate, a level determined visually by the operator not to be excessive, the trigger is released and vapor evacuation may be allowed to continue as desired by the operator. When evacuation is completed, the spray is gun is merely removed from the position of FIG. 11, allowing the housing 201 to return to the position of FIG. 10. This breaks the vacuum at the connecting engagement between the pocket 409 and the face of the fitting 407. With the nozzle 220 removed from the inlet opening 216, the liquid contained in the receiver 225 simply drains back through the passage 216 and into the interior of the basin 226 for return to the associated fluid solvent storage reservoir.

FIGS. 12 and 13 show another form of phase separator providing the same general operational features as those earlier described, but of a somewhat different structure. Here, the separator, generally designated 336, includes a stationary housing 301 affixed to or lying adjacent the upper portion of the basin 326. The upper surface 303 of the housing 301 includes openings 305, 307 providing passages 309, 311, respectively, to a vacuum source and to the atmosphere This connection is made by tubes 313, 315. The housing 301 includes a spray and vapor inlet passage generally designated 316. This passage 316 may be partially closed off by a cover element 318 affixed to and depending from a support strap 320 which has its upper end 322 affixed to the housing 301. The support strap 320 is flexible such that the cover 318 is biased to an open position of the passage 316. The cover element 318 may include an enlarged counterbored passage 324 as well as a reduced diameter outlet 327.

Another feature of the form of phase separator shown in FIGS. 12 and 13 is that of the vapor evacuation operating valve generally designated 248. This valve consists of a parallel set of alternately operating apertures 250, 252, associated respectively with lines 313, 315. The apertures are formed in a slide block 254 which moves in a housing 256, with the slide block 254 being biased upwardly by a spring 258. A knob 260 affixed to the block 254 serves as a control pedal. In use, when the spring 258 is extended, the slide block 254 is biased upwardly, opening line 315 to the atmosphere and pinching line 313 to a shut-off o closed position by reason of engagement between and edge of the aperture 250 and the housing 256. Alternatively, the vacuum line 313 is opened and the vent or atmosphere line is closed.

Referring now to FIG. 13, the initial operation of the separator is shown Here, a nose portion 318 of a nozzle 320 from a spray gun is engaged in vapor-tight relation with the counterbore passage 324 on the cover element 318. The element 318 is urged towards and closes off the passage 316 in the housing 301, except for the opening 327. When the spray gun trigger is actuated, fluid and vapor are discharged into the liquid receiver 325, with vapor accumulating in the head space. When the foot pedal is depressed, the force closing the vacuum line 313 is removed, and the vacuum line and passage 309 are open for evacuation of solvent from the housing head space. This also closes the atmospheric vent line so that the vacuum is effective to withdraw the vapors in question When the gun trigger is released by the operator and the gun nozzle is removed, the cover element 318 returns to its original or unstressed position, allowing the fluid to be drained from the receiver portion 325 of the housing 301. As long as the valve 248 is in the position shown, vapor will be evacuated from the interior of the housing; when the valve or pedal 248 is released, the vacuum supply is disconnected but the separator 301 is then vented to the atmosphere through the passage 311 in the line 315.

Referring now to another feature of the invention, FIG. 9 shows schematically that a manifold generally designated 528 may be associated with an "air mover" or "vacuum source" 500 to evacuate any receptacle 526 positioned above a reservoir 540 for solvent. While a preferred form of the invention utilizes a phase separator when the article being cleaned is a spray gun or the like, the vapor evacuation capabilities of the unit do not depend on the presence of the separator and vice versa.

Referring now to FIG. 3B, an alternate form of manifold generally designated 628 for use with a basin generally depicted 626. Here, the basin 626 includes an inturned flange 672 forming a part of its periphery. In this application, a manifold may be formed by the expedient of simply placing a formed section having sidewalls 674 and 668, and a top wall 666 in the desired position and securing them relative to the flange 672. FIG. 3C shows a fastener 679 extending through a mounting flange 681 into a margin of the flange 672. A gasket 683 seals the flanges 681, 672 to each other. A manifold inlet 692 is provided by spaced apart edges of flange 672 and sidewall 668.

In this embodiment, parts of the manifold are formed by the sink or basin, instead of forming the manifold as an entirely separate element. Functionally, the manifold vapor collection system is the same as the other described embodiment, however.

It will thus be seen that the invention provides a novel vapor collection and solvent separator system having a number of novel advantages and characteristics, including those referred to specifically herein and others which are inherent in the invention. Preferred forms of such vapor collection and solvent separator systems having been described in detail, by way of example, it is anticipated that the variations in the described forms of construction may occur to those skilled in the art, and that such variations may be made without departing from the spirit of the invention or the scope of the appended claims.

We claim:

1. An apparatus for cleaning spray guns and the like, said apparatus comprising, in combination, a cleaning basin with an outer periphery defining an open top portion of said basin, a reservoir adapted to receive and retain a supply of cleaning solvent, means for positioning said basin with respect to a fixed support surface; means operatively associated with said basin and said reservoir for causing solvent to be withdrawn from said reservoir and directed to the interior of said basin, means defining a fluid return flow path between said basin interior and the interior of said reservoir, whereby solvent withdrawn from said reservoir may be returned thereto, and a vapor collection system associated in use with said basin, said vapor collection system including a vapor collection manifold having means thereon to permit said manifold to be positioned adjacent said outer periphery of said basin, said vapor collection manifold being of generally tubular cross-section, and having portions thereof defining manifold inlet means extending about a substantial extent of the upper periphery of said basin, means defining an exhaust opening in a portion of said manifold, vacuum source means having its inlet end in communication with said manifold exhaust opening and its outlet end in communication with a vapor discharge line, said vacuum source being thereby adapted, upon actuation, to evacuate vapors from the interior of said vapor collection manifold by inducing air and vapor flow from the interior of said basin through said manifold and into said vapor discharge line.

2. An apparatus as defined in claim 1 wherein said basin includes a generally annular bead extending about and forming the circumference of said basin opening, and wherein said manifold includes a sidewall extension in the form of a locating flange extending over and covering a portion of said annular bead to for said manifold positioning means.

3. An apparatus as defined in claim 1 wherein said manifold is of generally rectangular cross-section construction and includes top and bottom walls and inner and outer sidewall portions disposed respectively parallel to each other, with said inlet means being defined by a radially inner edge of said manifold bottom wall and a lower edge of said manifold inner side wall.

4. An apparatus as defined in claim 1 wherein said basin is generally in the form of a portion of a sphere, having an outer margin in the form of a bead, with the plane of said bead being inclined such that the sink opening defined thereby is tilted downwardly at its forward end.

5. A solvent vapor evacuation apparatus as defined in claim 1 where said manifold vapor inlet means comprises a single continuous inlet defined by spaced apart edges of adjacent sidewalls forming a portion of said manifold.

6. A solvent vapor evacuation apparatus as defined in claim 1 where said manifold vapor inlet means comprises a plurality of spaced apart individual vapor inlet openings.

7. An apparatus as defined in claim 1 which further includes a solvent phase separator unit, said phase separator unit including a housing, said housing including an interior portion providing a liquid reservoir portion and a headspace portion disposed above said liquid reservoir portion, a principal inlet passage adapted to receive at least a portion of a spray gun nozzle, means defining an auxiliary inlet to said interior, said auxiliary inlet further including means alternatively permitting and preventing liquid flow therethrough, a separator unit exhaust opening formed in an upper portion of said separator housing, and means connecting said interior of said separator unit to the interior of said manifold, whereby, upon evacuation of air and vapor from said manifold, the interior of said phase separator unit is also subject to air and vapor evacuation.

8. An apparatus as defined in claim 7 wherein said principal inlet passage and said auxiliary passage are the same passage, with liquid solvent being directed into said housing interior when said gun nozzle is positioned in fluid-tight relation to said inlet passage, and being permitted to flow outwardly therefrom when said gun nozzle is removed from said fluid-tight relation with said passage.

9. An apparatus as defined in claim 7 wherein said separator housing is mounted for movement between portions, and wherein said means preventing liquid flow from said housing interior includes means moveable in response to said movement of said separator housing.

10. An apparatus as defined in claim 7 wherein said housing interior includes baffle means adapted to direct liquid flowing through said inlet passage towards a lower portion of said interior, to facilitate separation of said liquid and vapor.

11. A spray gun cleaning apparatus comprising, in combination, a cleaning basin having margins defining an upwardly directed opening therein and at least one sidewall portion, a vapor collection system including a vapor collection manifold, at least one manifold inlet for collecting solvent vapors from said basin interior, vapor outlet means adapted to be affixed to a vacuum source for evacuating said manifold interior, and a solvent phase separator unit operatively associated with said manifold, said separator unit including a housing and means defining an inlet opening therein for receiving and positioning a portion of a spray gun nozzle, and for directing liquid solvent to the interior of said housing, a liquid outlet formed in said separator housing, and means for alternately opening and closing the interior of said separator housing to air flow through said liquid inlet and outlet openings, said separator housing further including means defining a path of communication between said interior of said housing an said interior of said manifold, whereby, when said manifold interior is subject to evacuation, said housing interior is also subject to vapor evacuation.

12. A solvent phase separator unit for removing solvent vapors from the interior of a cleaning basin having an upwardly directed opening therein, said separator unit including a housing having an interior portion providing a liquid reservoir portion and a headspace portion disposed above said liquid reservoir portion, means defining an inlet passage extending into said housing interior, means defining a liquid outlet passage extending outwardly from said housing interior and being adapted to communicate with the interior of said cleaning basin, means actuable by a spray gun nozzle for closing off at least a portion of said liquid outlet passage, means defining a vapor outlet passage extending from said headspace portion to the exterior of said housing and being adapted for communication with a vapor collection line, whereby, solvent vapors may pass to said vapor collection line and liquid solvent may be returned to a basin associated with said separator unit.

13. An apparatus as defined in claim 12 wherein said housing includes a sight glass forming a part of said liquid reservoir portion.

14. An apparatus as defined in claim 12 wherein said housing includes means carrying a filter element for cleaning solvent disposed in said reservoir.

15. An apparatus as defined in claim 14 wherein said reservoir forming a part of said housing comprises a transparent chamber, and wherein said filter element is disposed within said chamber.

16. A vapor collection system adapted for removable association with the basin portion of an apparatus for cleaning mechanical parts by solvent circulation, wherein said apparatus includes a basin with an upwardly directed opening therein, said vapor collection system including a vapor collection manifold having means thereon to permit said manifold to be positioned adjacent the outer periphery of said basin, said vapor collection manifold being of generally tubular cross-section, and having portions thereof defining manifold inlet means adapted to be positioned adjacent a substantial portion of the periphery of said basin opening, means defining an exhaust opening in a portion of said manifold, vacuum source means having its inlet end in communication with said manifold exhaust opening and its outlet end in communication with a vapor discharge line, said vacuum source being thereby adapted, upon actuation, to evacuate vapors from the interior of said vapor collection manifold by inducing air and vapor flow from the interior of said basin through said manifold and into said vapor discharge line.

17. A vapor collection system as defined in claim 16 wherein said positioning means permits removable positioning of said manifold.

* * * * *